United States Patent [19]

Jackson

[11] 4,343,341
[45] Aug. 10, 1982

[54] PNEUMATIC TIRE AND WHEEL RIM ASSEMBLIES

[75] Inventor: William L. Jackson, SuttonColdfield, England

[73] Assignee: Dunlop Limited, London, England

[21] Appl. No.: 973,730

[22] Filed: Dec. 27, 1978

Related U.S. Application Data

[63] Continuation of Ser. No. 769,679, Feb. 17, 1977, abandoned.

[30] Foreign Application Priority Data

Feb. 17, 1976 [GB] United Kingdom ................ 6112/76

[51] Int. Cl.³ .......................... B60C 9/20; B60C 13/00
[52] U.S. Cl. ............................ 152/353 R; 152/361 R; 152/352 R
[58] Field of Search .......... 152/352 R, 352 A, 353 R, 152/353 C, 353 G, 361, 209 WT

[56] References Cited

U.S. PATENT DOCUMENTS

| | | | |
|---|---|---|---|
| 1,232,657 | 7/1917 | Cohn | 152/352 |
| 1,428,726 | 9/1922 | Warth | 152/352 X |
| 2,083,003 | 6/1937 | Budd | 152/352 X |
| 2,388,421 | 11/1945 | Kraft et al. | 152/352 |
| 2,939,502 | 6/1960 | Hindin et al. | 152/352 |
| 3,118,483 | 1/1964 | Beckadolph | 152/361 R |
| 3,542,107 | 11/1970 | Mills et al. | 152/352 |
| 3,631,913 | 1/1972 | Boileau | 152/353 R |
| 3,703,202 | 11/1972 | Maiocchi | 152/361 R X |
| 3,789,900 | 2/1974 | Verdier | 152/361 R X |
| 3,814,161 | 6/1974 | Powell et al. | 152/352 |
| 3,853,163 | 12/1974 | Mezzanotte et al. | 152/353 R |
| 3,916,968 | 11/1975 | Masson | 152/353 R |
| 3,918,506 | 11/1975 | Marzocchi | 152/361 R |
| 3,939,890 | 2/1976 | Abe | 152/354 |

Primary Examiner—Edward C. Kimlin
Assistant Examiner—Lois E. Boland
Attorney, Agent, or Firm—Stevens, Davis, Miller & Mosher

[57] ABSTRACT

A pneumatic tire having a tread reinforced over substantially the whole of its width by a breaker assembly, a pair of curved sidewalls each terminating in a tire bead and a radially extending reinforcing carcass ply. The tire has a shape factor of less than +0.85 when it is inflated to its normal working pressure.

3 Claims, 10 Drawing Figures

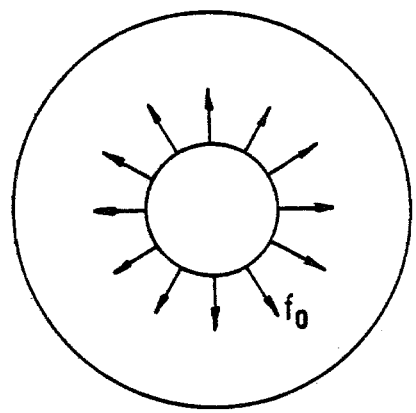
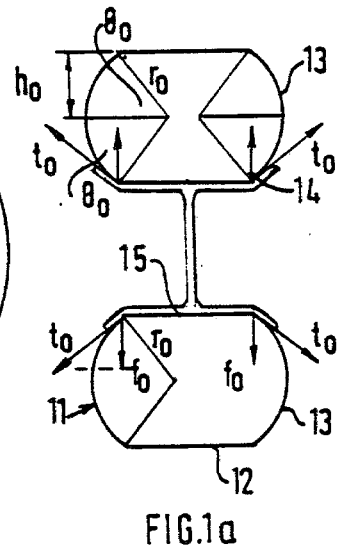
FIG.1b  FIG.1a
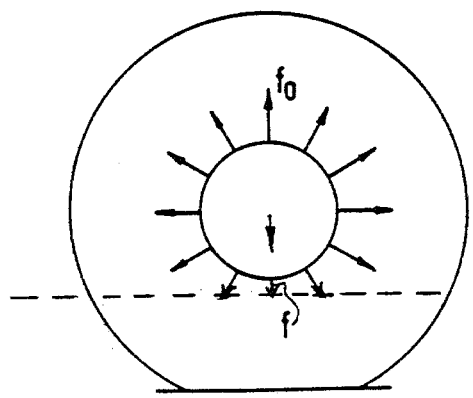
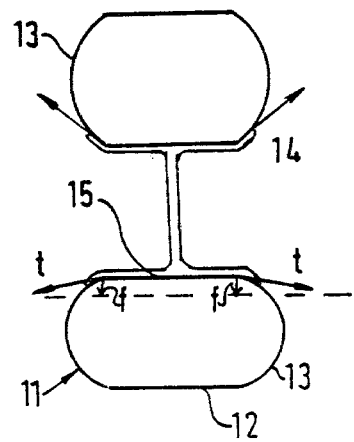
FIG.2b  FIG.2a

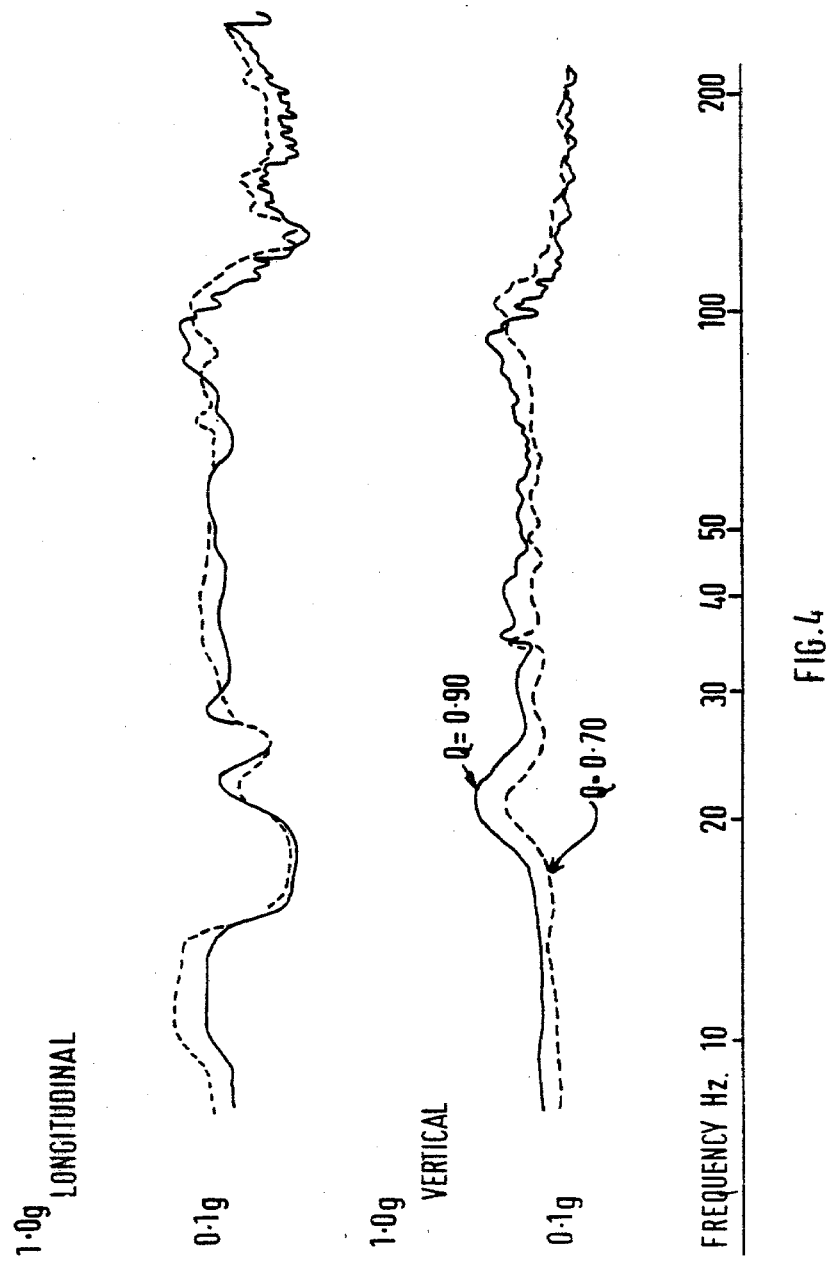

PNEUMATIC TIRE AND WHEEL RIM ASSEMBLIES

This is a continuation of application Ser. No. 769,679 filed Feb. 17, 1977, now abandoned.

The present invention relates to pneumatic tires.

It is standard practice in the vehicle industry to fit a larger tire to carry a greater load. This is necessary because attempts to increase the load on a type of a particular size result in excessive heat generation. Where necessary heat generation can be minimized by increasing inflation pressure but this leads to loss of comfort.

It is an object of the present invention to increase the total load-carrying capacity of a pneumatic tire without loss of comfort or excessive heat generation in the tire.

Accordingly the present invention provides a pneumatic tire having a tread reinforced over substantially the whole of its width by a breaker assembly, a pair of curved sidewalls each terminating in a tire bead, and a radially extending reinforcing carcass ply, the tire having a shape factor Q (as hereinafter defined), of less than +0.85 when it is inflated to its normal working pressure.

The shape factor Q, as used herein is equal to the tangent of half the angle subtended by the idealized sidewall t its center of curvature.

Preferably the tire has an aspect ratio of 30-75%.

The invention will now be described in more detail with reference to the accompanying drawings.

FIG. 1a is a diagrammatic cross-section of an inflated pneumatic tire and wheel rim assembly showing the forces produced by inflation;

FIG. 1b is a diagrammatic elevation of the assembly illustrated in FIG. 1a;

FIG. 2a is a diagrammatic cross-section of an inflated pneumatic tire and wheel rim assembly showing the deflection of the tire in the contact patch when the assembly is under load and showing how the forces are modified;

FIG. 2b is a diagrammatic elevation of the assembly illustrated in FIG. 2a;

FIG. 4 shows the results of comfort tests carried out on the two assemblies illustrated in FIGS. 3a and 3b;

Figure 3A:
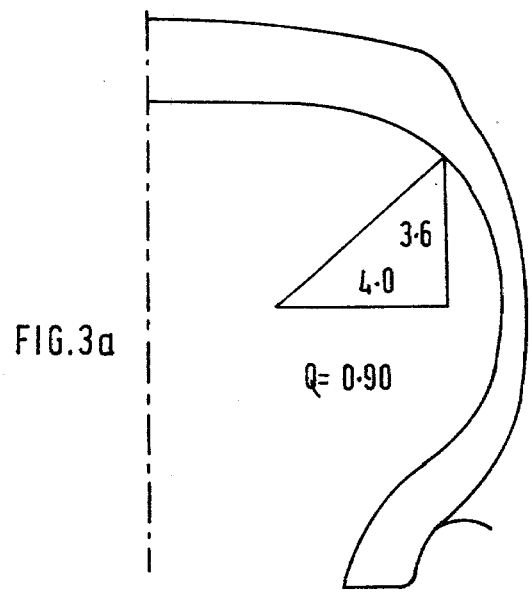
FIGS. 3a and 3b are diagrammatic cross-sections of the inflated pneumatic tire and wheel rim assemblies each having different shape factors.

The load carried by a tire varies approximately according to the equation:

$$L = (A + BP)d$$

L = Load
A = Structural stiffness
BP = Pneumatic stiffness
P = Inflation pressure
B = Pneumatic constant
d = Deflection at the working load The assembly schematically illustrated in FIGS. 1a, 1b, 2a and 2b comprises a tire 11 having a tread 12 and sidewalls 13 terminating in tire beads 14 mounted on a wheel rim 15.

In general attempts to increase either structural stiffness A or deflection d lead to excessive heat generation while increases in the inflation pressure P lead to loss of comfort. The aim of this invention is to increase the pneumatic constant B.

Referring to FIGS. 1(a) and 1(b), inflation of the tire 11 generates tensions as shown where $$t_o = Pr_o$$

and $$f_o = t_o \cos \theta_o$$

$f_o$ is the radial component of $t_o$ pulling outwards against the bead 14.

Referring to FIGS. 2(a) and 2(b) application of a load causes the sidewalls near the contact patch to deflect so that $f_o$ is reduced to f where $$f = Pr \cos \theta;$$

This unbalances the forces around the bead by an amount exactly equal and opposite in total to the applied load.

The unbalance is proportional to:

$$(f_o - f) = P(r_o \cos \theta_o - r \cos \theta)$$

Thus the pneumatic constant B is related to:

$$\frac{(f_o - f)}{P} = (r_o \cos \theta_o - r \cos \theta)$$

and can be increased by increasing:

$$(f_o/P) = r_o \cos \theta_o$$

In FIG. 1(a) it is clear that half the height is given by $$h_o = r_o \sin \theta_o$$

Comparing tires of the same height this invention seeks to improve load carrying capacity by varying $r_o$ and $\theta_o$ so as to maintain a constant $h_o$ while increasing $r_o \cos \theta_o$. That is by reducing the ratio $$Q = (r_o \sin \theta_o / r_o \cos \theta_o) = \tan \theta_o$$

where Q is the shape factor.

Thus for a fixed height of cross-section and a fixed pressure the pneumatic stiffness can be increased by reducing Q, i.e. by straightening the sidewalls.

Normally a tire with relatively straight sidewalls would return to a more circular cross-sectional shape when inflated and it is therefore necessary to change the tire design in order to prevent this. The tire reverts to the more circular shape because the increased sidewall tension tends to pull the edges of the breaker assembly inwards towards the tire beads while the inflation pressure pushes the center of the breaker outwards. This tendency is minimized in the present invention by increasing the resistance of the breaker assembly to bending moments about the circumferential center line of the breaker assembly.

This can be achieved by inserting high angle plies above and below the low angle plies used in the breaker assembly, increasing the thickness and stiffness of the materials used in the breaker assembly, by using high angle plies only in the breaker assembly except for strips of low angle plies at the edges of the breaker assembly or by applying any of the well-known engineering principles which determine the rigidity of reinforced structures.

It is also necessary to ensure that the effect of initially straight sidewalls is not lost by stretch due to inadequate sidewall tensile modulus. Thus relatively inextensible reinforcing cords are preferred.

The "comfort" of the tire, or ability to attenuate the effects of road irregularities, depends to some extent on the breaker tension. This is given by:

$$\frac{T}{R} = PW - 2\frac{M}{R} f_o$$

where
T is the breaker circumferential tension
R is the main breaker radius
W is the breaker width
M is the rim or bead radius
PW is the force per unit circumference pushing outwards.
$(2M/R) f_o$ is the combined force per unit circumference of two sidewalls pulling inwards. The breaker tension is proportional to the difference.
Thus increasing $f_o$ or reducing Q increases load but tends to reduce breaker tension which leads to small but definite improvements in comfort.

The equation may be rewritten $$PW\frac{T}{R} = 1 - \frac{2h_o M}{WR} \times \frac{1}{Q}$$

Thus reducing Q leads eventually to tire designs having zero tension when:

$$Q_c = (2h_o M/WR)$$

and having compressive forces when $$Q < Q_c$$

Firstly it is useful to recognize that large values of W, the width of breaker, lead to small values of $Q_c$, i.e. the possible reductions in Q are much greater for tire in which W is large compared with $2h_o$.

Thus the scope for improved load-carrying is greater for Low Aspect Ratio radial ply pneumatic tires.

Secondly it has been found that, for values of Q very much less than $Q_c$ the breaker collapses and buckles under the compressive stress. Nevertheless obvious means to support the breaker against this collapse are foreseen and will be used where the improved properties are sufficiently valuable to justify the extra cost.

Figure 3B:
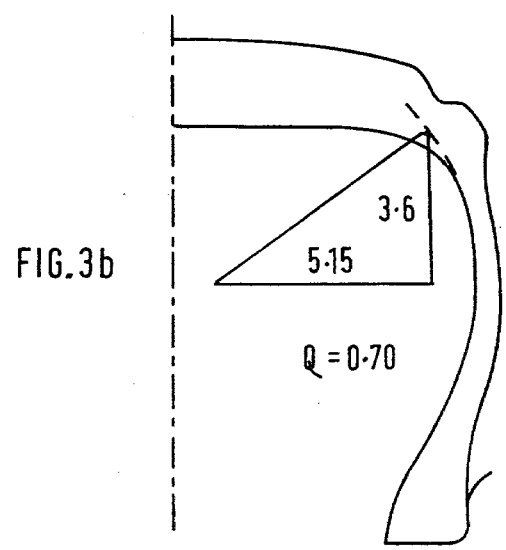

Referring now to FIGS. 3(a) and 3(b) these show the actual inflated shapes of two tire and wheel rim assemblies. FIG. 3(a) represents a conventional radial ply tire having a shape factor Q=0.90. FIG. 3(b) represents a modified tire having the same height and breaker width but, in accordance with the present invention, with much straighter sidewalls and extra high angle layers of breaker reinforcing material above and below the conventional layers used for FIG. 3(a).

The shape factor for this modified tire was Q=0.70.
The expected improvement in performance was therefore:

$$\left(\frac{0.90}{0.70} - 1\right) \times 100\% = 29\%$$

In fact, due to inaccuracies and to non linearities the figure achieved was less. About 24% increase in pneumatic stiffness and, since the structural stiffness was less, about 20% increase in total stiffness.

These tires were, in turn, pressed against the rough surface of a rotating drum and frequency spectra of the vertical acceleration of the axis averaged over a range of speeds, were recorded.

FIG. 4 compares the results for the two tires of FIGS. 3A and 3B. It is clear that over most of the frequency range 10 to 100 Hz the stiffer tire generated less axle vibration. Thus extra pneumatic stiffness, reduced heat generation and slightly improved comfort were achieved by reducing Q from a prior art value of 0.90 to 0.70.

It is emphasized that Q factor refers to the inflated shape and that most prior art tires show Q factors much larger than this lying most often in the range 1.10-1.50 and that their Q factor cannot be reduced below 0.85 without novel modifications to the shape and structure.

Since in practice tires do not have simple ideal shapes it is necessary to define what is meant by the "breaker assembly width", the "center of curvature of the sidewall flex zone" and such factors as "$h_o$" and "$r_o \cos \theta_o$"

Figure 5A:
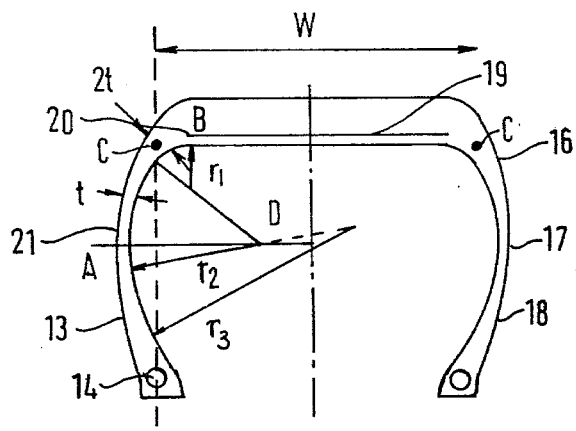
FIGS. 5a and 5b are diagrammatic cross-sections of part of an inflated radial ply tire and wheel rim assembly showing how the dimensions of a real tire may be related to the idealized types discussed above.

In general tire shapes can be drawn to a very close degree of approximation using three radii to reconstruct the shape of the inner sidewall as shown in FIG. 5a. The transition region 16 which is sharply curved has a radius of curvature $r_1$, the flex region 17 has a radius of curvature $r_2$ and the bead region 18 a radius of curvature $r_3$. The breaker assembly 19 usually shows a curvature as well but this is irrelevant. In FIG. 5a the breaker assembly 19 is shown as straight.

Normally the edge 20 of the breaker assembly 19 is separated from the sidewall by a transition region 16 which is thicker than the sidewall 13. If the thinnest part 21 of the sidewall 13 has a thickness "t" then it is possible to find a position in the transition region 16 where the thickness is "2t". A line drawn radially across the sidewall section at this position cuts the center line of the plies at the point "C". The first such point moving radially inwards round the section from the edge of the breaker is the relevant choice. The effective breaker assembly width W, is the axial distance CC across the tire between these points.

Moving radially inwardly around the tire section in the direction CA there is a region of roughly constant radius "$r_2$". In practice "$r_2$" is not exactly constant and it is the minimum value of "$r_2$" which is relevant. The center for this radius is D.

Figure 5B:
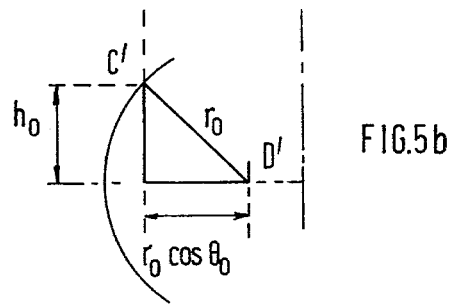

Given the vertical center line of the section, the vertical line through C and through the center of the head wire 14, and an appropriate starting point D, as in FIG. 5b (which is a schematic derivation from FIG. 5a), the idealized cross-section is constructed by drawing an arc of radius $r_o$ with its center at D' to cut the vertical line through C and through the center of the bead wire at the point C', this arc having a half-angle of $\theta_o$. The relevant dimensions of the idealized tire are marked on the diagram. The idealized sidewall radius $r_o$ is close to $r_2$ in value and is found by adding the distance from the center ply line to the inner surface of the tire onto the minimum value $r_2$. The result $r_o$ is usually very close to the length CD in FIG. 5(a).

Figure 6:
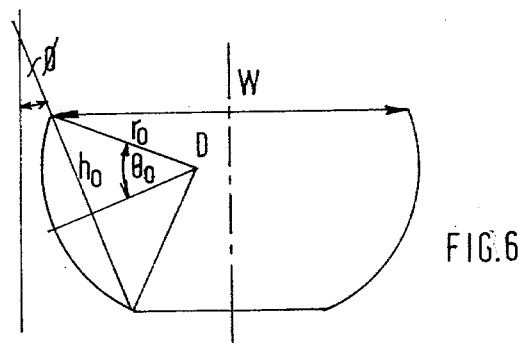
FIG. 6 is a diagrammatic cross-section of part of an inflated radial ply pneumatic tire and wheel rim assembly showing a difference between the effective rim and breaker width.

FIG. 6 shows the idealized cross-section of another form of a tire according to the present invention mounted on a rim which is narrower than the effective breaker width 'W'. The parameters chosen are exactly the same as in FIG. 5 with the exception that the effective height of the tire is changed from $2h_o$ to $2h_o \cos \phi$. This is only relevant when the actual magnitude of the radial force for a given tire deflection is considered.

Having now described my invention-what I claim is:

1. A radial pneumatic tire comprising a tread, a tread-reinforcing breaker assembly beneath said tread and extending across the full width thereof, a pair of tire beads, a pair of flexible tire sidewalls each radially extending between a respective one of said beads and a respective edge of said breaker, said tire being reinforced by a reinforcing carcass ply of relatively inextensible cords, said breaker having both at least one low angle ply and at least two high angle plies, one of said high angle plies being above and one of said plies being below said low angle ply to make the breaker substantially transversely rigid so as to resist bending moments about its center and inward pull of said edges by said sidewalls when said tire is inflated to its normal working pressure and to minimize cross-sectional circularity of the tire when so inflated, each of said sidewalls extending from said breaker assembly towards a bead wire core along an arc defining a flex zone which has a respective center of curvature, said arc beginning at a first point adjacent said breaker assembly where the thickness of said sidewall is substantially twice the minimum thickness of said sidewall and ending at a point defined by the intersection of a vertical line extending through said first point with said sidewall, said sidewalls being formed to have a shape when the tire is inflated to its normal working pressure such that the tangent of half the angle subtended by the arc of each of the flexible sidewalls at its respective center of curvature is less than +0.85, said angle controlling the pneumatic constant of said tire wherein a decrease in said angle and the arc defining said angle resulting from the increased transverse rigidity of said breaker reduces the circularity of said sidewalls, increasing said pneumatic constant, resulting in an increased load capacity of said tire.

2. The tire of claim 1 having an aspect ratio of 30 to 75%.

3. A radial pneumatic tire having an increased load capacity comprising a tread, a tread-reinforcing breaker assembly beneath said tread and extending across the full width thereof, a pair of tire beads, a pair of flexible tire sidewalls each radially extending between a respective one of said beads and a respective edge of said breaker, said tire being reinforced by a reinforcing carcass ply of relatively inextensible cords, said breaker having both a low angle ply, and one high angle ply on each side of said low angle ply to make it substantially transversely rigid so as to resist bending moments about its center and inward pull of said edges by said sidewalls when said tire is inflated to its normal working pressure and to minimize cross-sectional circularity of the tire when so inflated, each of said sidewalls being curved at a substantially constant radius beginning at an end of said sidewall which is closest to an end of said breaker assembly at a first point where the sidewall thickness is twice the minimum thickness of said sidewall to define an arc comprising a flex zone having said radius and curving away from said breaker, said arc subtending an angle having a vertex at the center of said curvature, one-half of said angle having a tangent less than 0.85 when said tire is inflated to its normal working pressure, said tire having a pneumatic constant inversely proportional to the magnitude of said angle such that the increased transverse rigidity of said breaker reduces the curvature of said sidewalls, increasing said pneumatic constant.

* * * * *